United States Patent [19]
Saitoh et al.

[11] Patent Number: 5,534,977
[45] Date of Patent: Jul. 9, 1996

[54] IMAGE FORMING APPARATUS HAVING A FUNCTION TO CHARGE A PHOTORECEPTOR DRUM AT AN APPROPRIATE POTENTIAL

[75] Inventors: Yasushi Saitoh; Masashi Matsumoto; Takao Ichihashi; Shuji Yamada, all of Osaka, Japan

[73] Assignee: Mita Industrial Co., Ltd., Osaka, Japan

[21] Appl. No.: 213,530

[22] Filed: Mar. 16, 1994

[30] Foreign Application Priority Data

Mar. 22, 1993 [JP] Japan .................................... 5-062199

[51] Int. Cl.⁶ .................................................. G03G 21/00
[52] U.S. Cl. ........................ 355/208; 355/207; 355/219
[58] Field of Search .................................... 355/208, 219, 355/229, 214, 228, 205, 207

[56] References Cited

U.S. PATENT DOCUMENTS

| | | | |
|---|---|---|---|
| 4,935,777 | 6/1990 | Noguchi et al. | 355/219 X |
| 4,939,542 | 7/1990 | Kurando et al. | 355/208 |
| 4,963,926 | 10/1990 | Onishi et al. | 355/219 X |
| 5,173,734 | 12/1992 | Shimizu et al. | 355/208 |
| 5,182,596 | 1/1993 | Nakazawa et al. | 355/208 X |
| 5,225,872 | 7/1993 | Fukushima | 355/214 X |
| 5,285,242 | 2/1994 | Kotani | 355/208 |
| 5,305,060 | 4/1994 | Fukushima | 355/219 X |
| 5,436,697 | 7/1995 | Negishi | 355/208 |

*Primary Examiner*—Arthur T. Grimley
*Assistant Examiner*—Shuk Y. Lee
*Attorney, Agent, or Firm*—Beveridge, DeGrandi, Weilacher & Young

[57] ABSTRACT

An image forming apparatus with which the surface potential of the photoreceptor drum is made appropriate reliably in a relatively short time is provided with the following: a charger unit for charging the surface of the photoreceptor drum; an exposing unit for forming a latent image; a potential sensor for detecting a charge potential; and a controller for controlling outputs of the charger unit and the exposing unit. The surface potential of the photoreceptor drum is made appropriate by detecting and correcting the potential after the photoreceptor drum surface is charged at a potential close to a desired potential. After both the dark and bright portions are charged at appropriate potentials, image formation is performed.

9 Claims, 4 Drawing Sheets

IMAGE FORMING APPARATUS HAVING A FUNCTION TO CHARGE A PHOTORECEPTOR DRUM AT AN APPROPRIATE POTENTIAL

BACKGROUND OF THE INVENTION

1. Field of the Invention

The present invention relates to an image forming apparatus such as an electrophotographic copying machine and a printer, and more particularly, to an image forming apparatus having a function to charge the surface of a photoreceptor drum at an appropriate potential.

2. Description of the Prior Art

In an image forming apparatus such as an electrophotographic copying machine and a laser beam printer to form an image, the surface of a photoreceptor drum is charged by means of a main charger unit of Scorotron type and exposed to light to form an electrostatic latent image thereon. Since the quality of the image formed by this method depends on the charging condition of the surface of the photoreceptor drum, it is necessary that the photoreceptor drum be charged at an appropriate electric potential. A conventional method to promptly make the charging appropriate is such that the main charger unit is controlled by means of a voltage data obtained through a calculation by use of a function based on a grid voltage data and a main charging voltage data used for charging in the previous image formation. However, since the voltage data as it is obtained through calculation is used for the charging in image formation, an error may be caused and an appropriate surface potential is not always obtained.

For example, in a case such as the continuous copying where the present image formation is performed immediately after the previous image formation, a surface voltage which is substantially appropriate is obtained even though the photoreceptor drum surface is charged by using the voltage data obtained through calculation. However, when the present image formation is performed a considerable period of time after the previous image formation, it is impossible to obtain an appropriate surface voltage since the environmental conditions are different.

SUMMARY OF THE INVENTION

An object of the present invention is to provide an image forming apparatus with which the surface electric potential of a photoreceptor drum is made appropriate reliably in a relatively short time. An apparatus for achieving this object is provided with charging means for charging the surface of a photoreceptor drum, exposing means for forming a latent image, a potential sensor for detecting a charge potential and controlling means for controlling the charging means and the exposing means so that the charge potential approaches a desired potential. The potential is made appropriate, with respect to both a dark portion on which no image is formed and a bright portion forming an image, by controlling a voltage applied to the main charger unit and an output intensity of a laser unit for exposure. The potentials of the dark and bright portions are made appropriate in the following manner: first, the photoreceptor drum is charged by using a voltage applied in the previous charging, and the charging and the potential detection are repeated so that the potential approaches the desired potential. After the surface of the photoreceptor drum is charged at an appropriate potential, image formation is performed.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, an electrophotographic copying machine embodying the present invention will be described with reference to the drawings.

Figure 1:
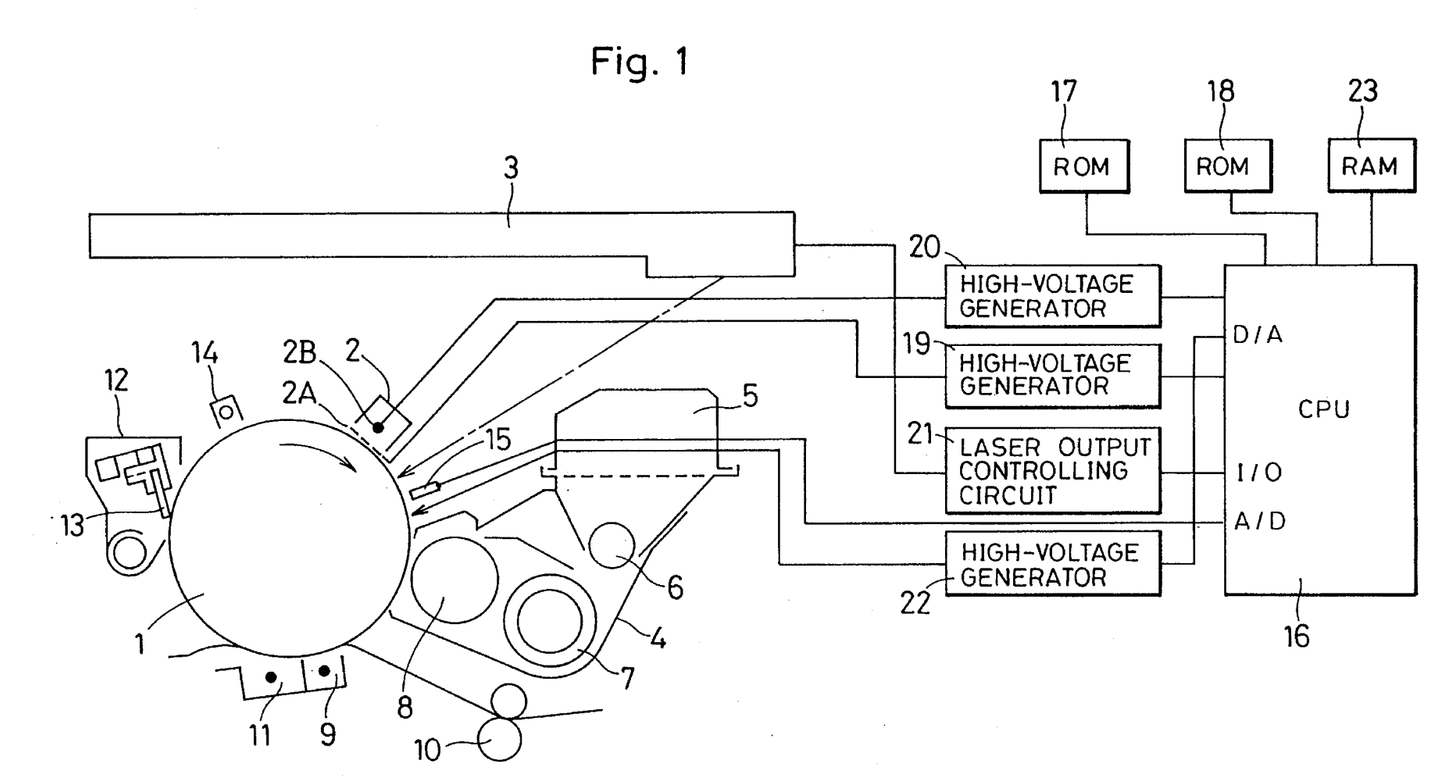
FIG. 1 is a schematic view of an electrophotographic copying machine embodying the present invention.

Referring to FIG. 1, there is schematically shown an arrangement of the copying machine. A photoreceptor drum 1 is rotated at a constant speed in a direction of the arrow by an operation of a copy start key. The photoreceptor drum 1 comprises a base drum made of, for example, an aluminum material on which a photosensitive selenic material capable of being charged excellently is deposited. Along the periphery of the photoreceptor drum 1, the following are provided in its rotation direction: a charging unit; an exposing unit; a developing unit; a transferring unit; a separating unit; a cleaning unit; and a charge-removing unit.

The surface of the photoreceptor drum 1 is uniformly charged by a main charger unit 2 of Scorotron type. This charge potential will be referred to as a dark portion potential. The main charger unit 2 is provided with a grid electrode 2A and a high-voltage electrode 2B for main charging voltage application. By controlling voltages applied to the grid electrode 2A and the high-voltage electrode 2B, the dark portion potential is made appropriate. A laser unit 3 exposes the surface of the charged photoreceptor drum 1. The surface potential of the exposed portion decreases in correspondence with the exposure amount, thereby forming a latent image. The potential will be referred to as a bright portion potential, which is made appropriate by controlling the voltage applied to the laser unit 3. The latent image formed on the surface of the photoreceptor drum 1 is transformed into a toner image by a developer unit 4. Toner supplied from a toner hopper 5 through a supply roller 6 is mixed with carrier by a stirring roller 7 to form magnetic brushes made of carrier to which toner adheres on the surface of a developing roller 8. The magnetic brush is brought into contact with the surface of the photoreceptor drum 1 by rotating the developing roller 8, and toner is transported onto the surface in accordance with the electrostatic latent image, thereby forming a toner image. The toner forming the toner image is transferred by a transferring unit 9 onto a sheet fed through paper feeding rollers 10. After the transfer, a separating unit 11 dissolves the attraction relationship between the photoreceptor drum 1 and the sheet by applying an alternating current electric field to the surface of the drum 1, thereby separating the sheet on which the toner has been transferred from the drum 1.

Residual toner and the charge on the surface of the photoreceptor drum 1 are removed by a blade 13 of a cleaning unit 12 made of rubber material and by light from a charge removing lamp of a charge removing unit 14, respectively.

To obtain a copy image of good quality, it is necessary that both the dark portion potential generated by the main charger unit 2 and the bright portion potential caused by laser irradiation from the laser unit 3 be set at appropriate values in accordance with characteristics of the photosensitive material of the photoreceptor drum 1 and environmental conditions. Appropriate desired charge potentials will be referred to as a dark portion desired potential and a bright portion desired potential. In this apparatus, in order that the actual dark portion and bright portion potentials approach the dark portion and bright portion desired potentials as much as possible, a potential sensor 15 and a microcomputer are provided. The potential sensor 15 is arranged between the exposing unit and the developing unit to detect a surface potential of the photoreceptor drum 1. The microcomputer includes a central processing unit (CPU) 16, a read only memory (ROM) 17 for program storage, a ROM 18 for data storage and a random access memory (RAM) 23 shown in FIG. 1. Based on a potential detected by the potential sensor 15, the CPU 16 varies a grid voltage, a main charging voltage and a laser output.

Figure 2:
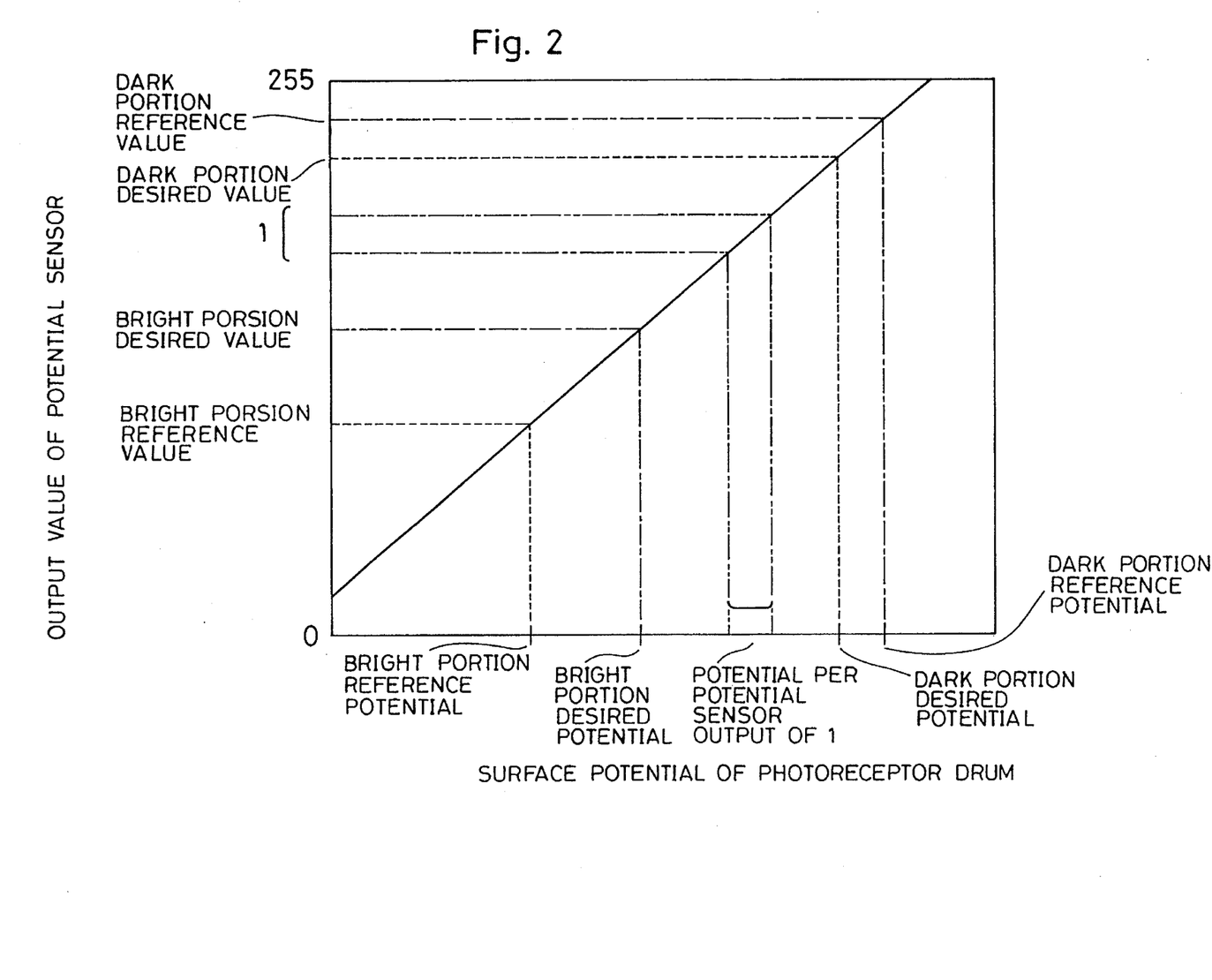
FIG. 2 shows a photoreceptor drum surface potential-to-sensor output characteristic of the embodiment of the present invention.

As the potential sensor 15 of this apparatus, a sensor is used which outputs values ranging from 0 to 255 in linear correspondence with the detected potential. The surface potential of the photoreceptor drum 1 and the output of the potential sensor 15 are in linear relationship as shown in FIG. 2. Generally, the sensitivity of the potential sensor varies depending on environmental conditions and an output thereof varies accordingly. That is, the inclination of the straight line in FIG. 2 varies. Therefore, to apply appropriate dark portion and bright portion desired potentials to the surface of the photoreceptor drum 1, it is necessary to correct the variation. This correction is made in the following manner. First, a voltage of, for example, 800V is directly applied to the surface of the photoreceptor drum 1 as a dark portion reference voltage. Then, a potential of 800V is generated on the surface of the photoreceptor drum 1, which will be referred to as a dark portion reference potential. An output value (for example, 240) of the potential sensor 15 detecting this potential will be referred to as a dark portion reference value. Similarly, a voltage of, for example, 200V is directly applied as a bright portion reference voltage, and an output value (for example, 10) of the potential sensor 15 which corresponds to the bright portion reference potential will be referred to as a bright portion reference value. From these values, the straight line of the surface potential-to-detection output characteristic shown in FIG. 2 is obtained.

From this characteristic, output values corresponding to predetermined dark portion and bright portion desired potentials, respectively, that is, the dark portion and bright portion desired values at that sensitivity of the potential sensor 15 are obtained. Specifically, the desired values are obtained by $$Y = \frac{\text{Dark portion reference value} - \text{Bright portion reference value}}{\text{Dark portion reference potential} - \text{Bright portion reference potential}} \times \left( X - \frac{\text{Bright portion reference potential}}{} \right) + \frac{\text{Bright portion reference value}}{}$$

where X represents the dark or bright portion desired potential and Y represents the dark or bright portion desired value.

To control the charging so that the potential sensor 15 outputs the desired value, it is necessary to find a relationship between the variation in output of the potential sensor 15 and the variation in voltage of the main charger unit 2 or the laser unit 3. When changing the output value of the potential sensor 15 by 1 is defined as "one step", the voltage change amounts of the main charger unit 2 and the laser unit 3 necessary for the one-step change are obtained by $$\text{One-step main charger voltage} = \frac{\text{Dark portion reference potential} - \text{Bright portion reference potential}}{\text{Dark portion reference value} - \text{Bright portion reference value}} \times \frac{1}{\text{Potential change amount per unit amount of charger voltage change}}$$

$$\text{One-step laser voltage} = \frac{\text{Dark portion reference potential} - \text{Bright portion reference potential}}{\text{Dark portion reference value} - \text{Bright portion reference value}} \times \frac{1}{\text{Potential change amount per unit amount of laser voltage change}}$$

The charging is controlled by the CPU 16. The ROM 17 stores a program therefor. The ROM 18 stores voltage data (a plurality of grid voltages and a plurality of main charging voltages at each grid voltage), a laser control voltage, dark and bright portion reference voltages and dark and bright portion desired potentials. The voltage data are read out by the CPU 16 and digital-to-analog-converted (D/A-converted) and transmitted to high-voltage generators 19 and 20. The high-voltage generators 19 and 20 apply the grid voltage and the main charging voltage to the grid electrode 2A and the high-voltage electrode 2B, respectively. The laser control voltage read out by the CPU 16 from the data ROM 18 is transmitted through an input/output (I/O) port to a laser output controlling circuit 21. A pulse-like laser controlling voltage in accordance with the voltage value is supplied to the laser unit 3 to control the laser output. A high-voltage generator 22 applies to the surface of the photoreceptor drum 1 dark and bright portion reference voltages in accordance with the dark and bright portion reference voltage values read out from the data ROM 18 and D/A-converted until the potential sensor 15 reads out the surface potential at that time. The high-voltage generator 22 operates only before copy scanning. The dark and bright portion reference values obtained at that time are temporarily stored in the RAM 23 together with the dark and bright portion desired values, voltage data and the laser control voltage of the previous copying.

Figure 3:
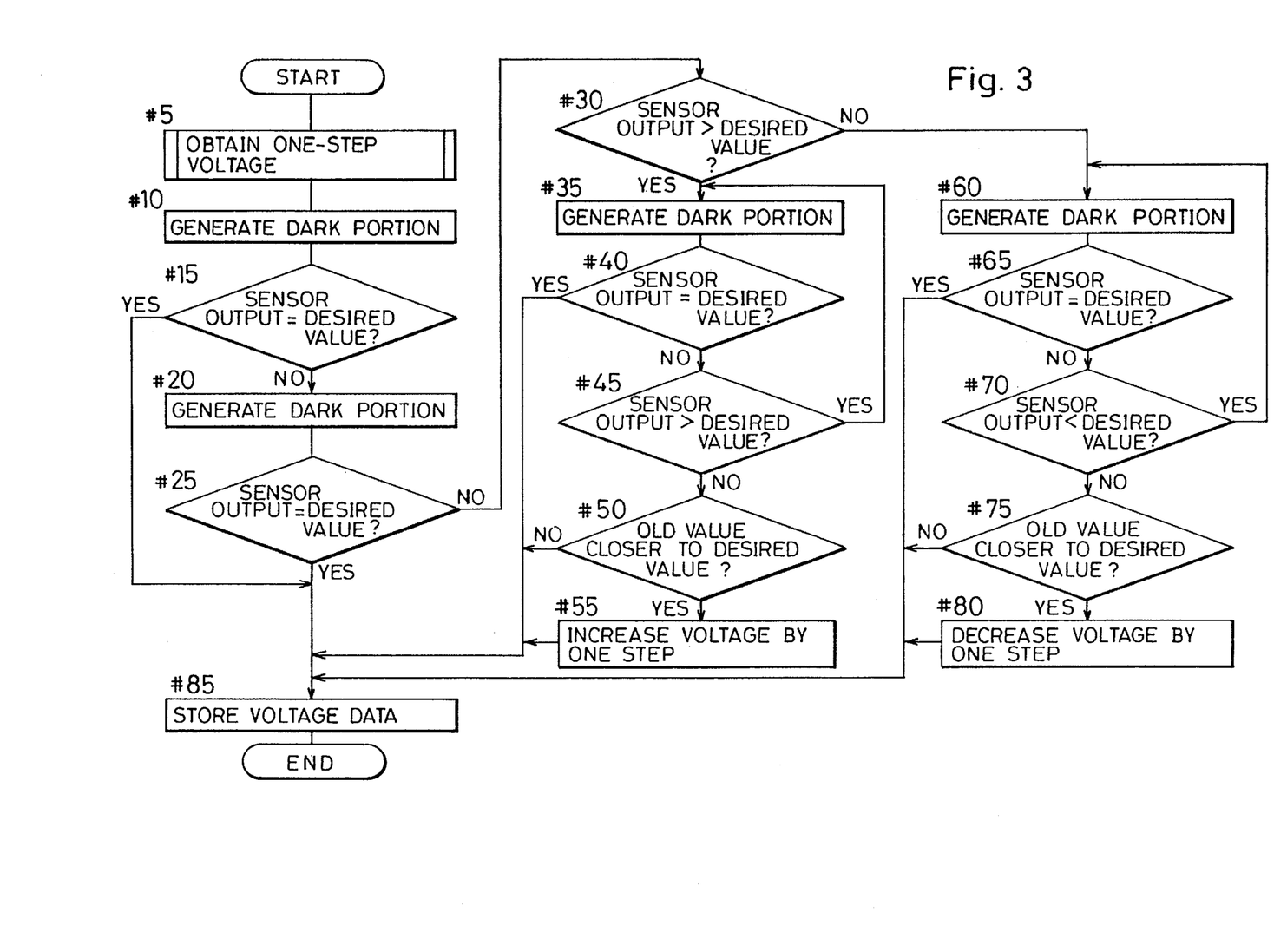
FIG. 3 is a flowchart of a control operation for making the dark portion potential appropriate in the embodiment of the present invention.
Figure 4:
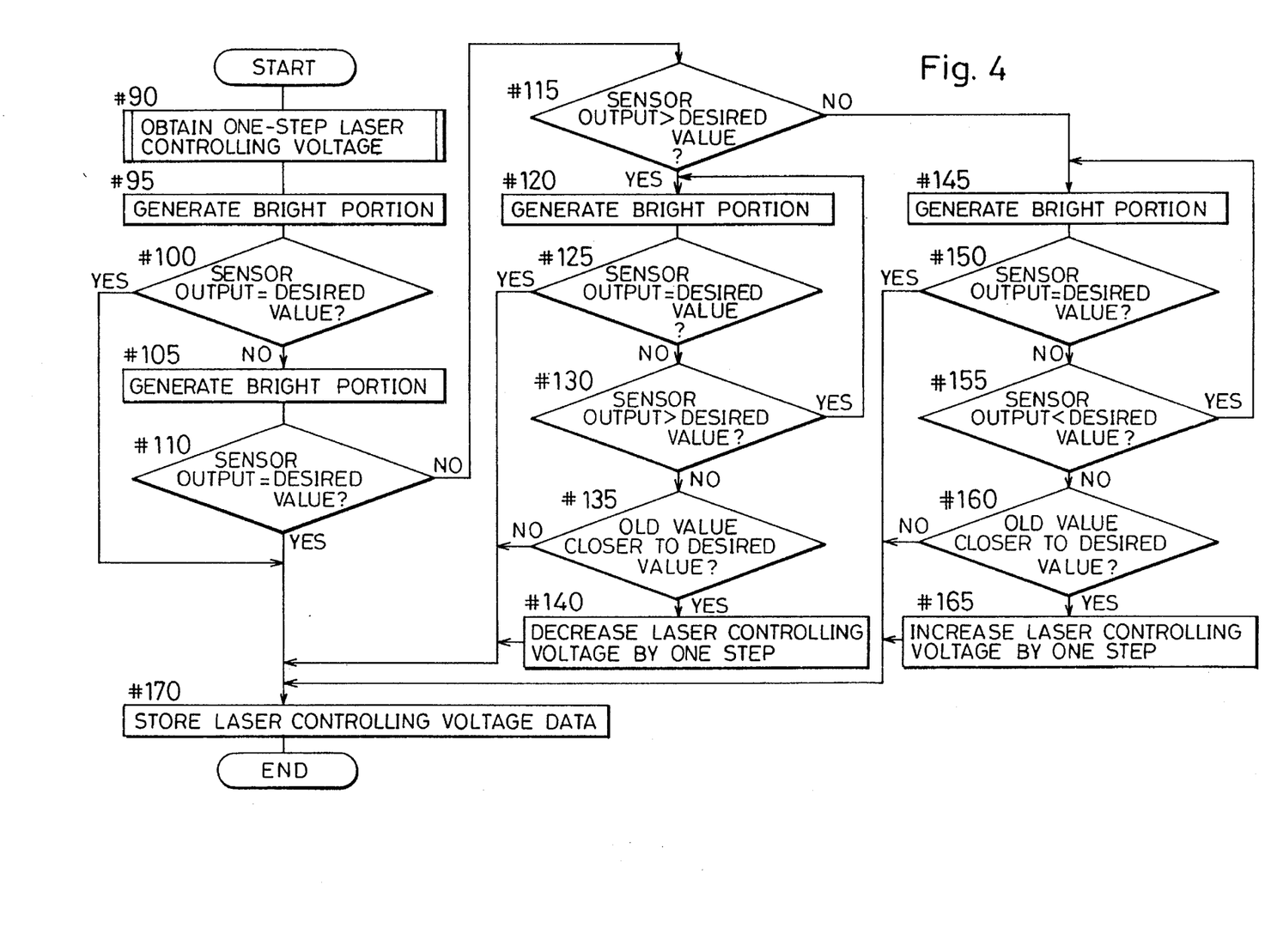
FIG. 4 is a flowchart of a control operation for making the bright portion potential appropriate in the embodiment of the present invention.

Subsequently, a control operation of the CPU 16 for obtaining the desired surface potential will be described with reference to the flowcharts of FIGS. 3 and 4. When the copy start key is operated, the CPU 16 starts its control operation based on the control program stored in the program ROM 17 before the copy scanning. First, at step #5 of FIG. 3, a one-step main charger voltage necessary to change the output of the potential sensor 15 by one is obtained and stored in the RAM 23.

At step #10, the voltage data used for charging in the previous image formation is read out from the RAM 23, and after converted into analog format, the data is outputted to the high-voltage generators 19 and 20 so that the main charger unit 2 charges the surface of the photoreceptor drum 1, thereby generating a dark portion potential. Then, the dark portion potential is detected by the potential sensor 15 under a condition where the laser unit 3 is disabled, and at step #15, whether or not the sensor output value coincides with the dark portion desired value obtained under the present environmental conditions is judged.

When they coincide, the process proceeds to step #85, where the voltage data is stored in the RAM 23 to use it for charging in the present image formation, and the control operation ends. When they do not coincide, the process proceeds to step #20, where the difference between the output and desired values is calculated to change the voltage data, and the changed voltage data is outputted to the high-voltage generators 19 and 20 to charge the surface of the photoreceptor drum 1, thereby generating a dark portion potential again.

Then, the dark portion potential at this time is detected again by the potential sensor 15, and at step #25, whether the sensor output value coincides with the dark portion desired value or not is judged again. When they coincide, the process proceeds to step #85, and the control operation ends. When they do not coincide, at step #30, whether the sensor output value is larger than the dark portion desired value or not is judged. When it is larger, at step #35, the voltage data is reduced by one step and outputted to the high-voltage generators 19 and 20 to charge the surface of the photoreceptor drum 1, thereby generating a dark portion potential again.

The dark portion potential at this time is detected again by the potential sensor 15, and at step #40, whether the sensor output value coincides with the dark portion desired value or not is judged. When they coincide, the process proceeds to step #85, and the control operation ends. When they do not coincide (that is, depending on the resolution, there are occasions when they do not coincide), the process proceeds to step #45, where whether the sensor output value is larger than the dark portion desired value or not is judged again. When it is larger, the process returns to step #35. Then, steps #35, #40 and #45 are repeated until it is judged that the sensor output value coincides with the dark portion desired value or that the sensor output value is smaller than the dark portion desired value.

When it is judged that the sensor output value is smaller than the dark portion desired value at step #45, at step #50, whether or not the one-step previous voltage data (that is, the voltage data larger than the present one by one step) is closer to the dark portion desired value is judged. When it is not closer, the process proceeds directly to step #85, and the control operation ends. When it is closer, after the voltage data is increased by one step at step #55, the process proceeds to step #85, and the control operation ends.

When it is judged at step #30 that the sensor output value is smaller than the dark portion desired value, the process proceeds to step #60, where the voltage data is increased by one step and outputted to the high-voltage generators 19 and 20 to charge the surface of the photoreceptor drum 1, thereby generating a dark portion potential again. Then, the dark portion potential at this time is detected again by the potential sensor 15, and at step #65, whether the sensor output value coincides with the dark portion desired value or not is judged. When they coincide, the process proceeds to step #85.

When they do not coincide, the process proceeds to step #70, where whether the sensor output value is smaller than the dark portion desired value or not is judged. When it is smaller, the process returns to step #60, and steps #60, #65 and #70 are repeated until it is judged that the sensor output coincides with the dark portion desired value or that the sensor output value is larger than the dark portion desired value.

When it is judged at step #70 that the sensor output value is larger than the dark portion desired value, at step #75, whether or not the one-step previous voltage data (that is, the voltage data smaller than the present one by one step) is closer to the dark portion desired value is judged. When it is not closer, the process proceeds directly to step #85. When it is closer, after the voltage data is reduced by one step at step #80, the process proceeds to step #85, and the control operation ends.

After the control operation for making the dark portion potential appropriate ends, a control operation for making the bright portion potential appropriate is performed. First, at step #90 of FIG. 4, a one-step laser controlling voltage necessary to change the output of the potential sensor 15 by one is obtained and stored in the RAM 23. Then, at step #95, the laser controlling voltage data used for exposure in the previous image formation is read out from the RAM 23 and outputted to the laser output controlling circuit 21 through the I/O port to expose the surface of the photoreceptor drum 1 which has been charged based on the voltage data obtained through the above-described control operation of FIG. 3, thereby generating a bright portion potential. The bright portion potential at this time is detected by the potential sensor 15, and at step #100, whether or not the sensor output value coincides with the bright portion desired value obtained under the present environmental conditions is judged.

When they coincide, the process proceeds to step #170, where the laser controlling voltage is stored in the RAM 23 to use it for exposure in the present image formation, and the control operation ends. When they do not coincide, the process proceeds to step #105, where the difference between the output and the desired value is calculated to change the laser controlling voltage data, and the changed data is outputted to the laser output controlling circuit 21 to expose the surface of the photoreceptor drum 1, thereby generating a bright portion potential again.

The bright portion potential at this time is detected again by the potential sensor 15, and at step #110, whether the sensor output value coincides with the bright portion desired value or not is judged again. When they coincide, the process proceeds to step #170, and the control operation ends. When they do not coincide, at step #115, whether the sensor output value is larger than the bright portion desired value or not is judged. When it is larger, at step #120, the laser controlling voltage data is increased by one step and outputted to the laser output controlling circuit 21 to expose the surface of the photoreceptor drum 1, thereby generating a bright portion potential again.

The bright portion potential at this time is detected again by the potential sensor 15, and at step #125, whether the sensor output value coincides with the bright portion desired value or not is judged. When they coincide, the process proceeds to step #170, and the control operation ends. When they do not coincide, the process proceeds to step #130, where whether the sensor output value is larger than the bright portion desired value or not is judged again. When it is larger, the process returns to step #120, and steps #120, #125 and #130 are repeated until it is judged that the sensor output value coincides with the bright portion desired value or that the sensor output value is smaller than the bright portion desired value.

When it is judged at step #130 that the sensor output value is smaller than the bright portion desired value, at step #135, whether or not the one-step previous laser controlling voltage data (that is, the laser controlling voltage data smaller than the present one by one step) is closer to the bright portion desired value is judged. When it is not closer, the process proceeds directly to step #170. When it is closer, after the laser controlling voltage data is reduced by one step at step #140, the process proceeds to step #170, and the control operation ends.

When it is judged at step #115 that the sensor output value is smaller than the bright portion desired value, the process proceeds to step #145, where the voltage data is reduced by one step and outputted to the laser output controlling circuit 21 to expose the surface of the photoreceptor drum 1, thereby generating a bright portion potential again. Then, the bright portion potential at this time is detected again by the potential sensor 15, and at step #150, whether the sensor output value coincides with the bright portion desired value or not is judged. When they coincide, the process proceeds to step #170.

When they do not coincide, the process proceeds to step #155, where whether the sensor output value is smaller than the bright portion desired value or not is judged. When it is smaller, the process returns to step #145, and steps #145, #150 and #155 are repeated until it is judged that the sensor output value coincides with the bright portion desired value or that the sensor output value is larger than the bright portion desired value.

When it is judged at step #155 that the sensor output value is larger than the bright portion desired value, at step #160, whether or not the one-step previous laser controlling voltage data (that is, the laser controlling voltage data larger than the present one by one step) is closer to the bright portion desired value is judged. When it is not closer, the process proceeds directly to step #170. When it is closer, after the laser controlling voltage data is increased by one step at step #165, the process proceeds to step #170, and the control operation ends.

Thus, when the copy start key is operated, before the copy scanning, the optimization of the dark and bright portion potentials are always made appropriate in consideration of the sensor resolution and environmental conditions. After the voltage data and the laser controlling voltage data appropriate for charging and exposure in image formation, respectively, are obtained through the control, copy scanning is performed by use of the data to form an image.

In this embodiment, the charge potential of the photoreceptor drum surface is made appropriate prior to image formation every time image formation is performed. When image formation is continuously performed, however, an excellent result would be obtained even if the charging and exposure conditions used in the previous image formation are used. To achieve this, the charging may be controlled in the following manner: the CPU 16 is provided with a timer function and the charge potential is made appropriate only when an elapsed time since the previous image formation exceeds a predetermined period of time, and otherwise, charging and exposure are performed under the previous image formation conditions.

As described above, according to the present invention, to make the surface potential of the photoreceptor drum appropriate, not only the voltage data of the previous image formation are referred to but also the photoreceptor drum surface is actually charged based on the voltage data and the applied voltage is adjusted so that the surface potential of the photoreceptor drum approaches a desired potential. As a result, the surface potential is made appropriate reliably. Moreover, the required time is relatively short. Further, since not only the potential of the dark portion on which no image is formed, i.e. the background of the image, but also the potential of the bright portion which forms the image, a copy image of good quality is obtained. Thus, the present invention is very useful and effective for use in an electrophotographic copying machine and a printer.

Obviously, many modifications and variations of the present invention are possible in light of the above teachings. It is therefore to be understood that within the scope of the appended claims, the invention may be practiced other than as specifically described.

What is claimed is:

1. An image forming apparatus comprising:

a photoreceptor;

charging means for charging a surface of the photoreceptor;

detecting means for detecting a potential on the surface of the photoreceptor and providing an output value indicative thereof;

potential generating means for generating a predetermined potential on the surface of the photoreceptor directly;

detection sensitivity correcting means for correcting sensitivity of the detecting means based on an output value of the detecting means after the detecting means has provided an output value indication of a potential, generated by the potential generating means, on the surface of the photoreceptor and for calculating a desired output value for the output value of the detecting means corresponding to a desired charge potential;

controlling means for controlling voltages applied to the charging means so that an output value of the detecting means, while detecting a potential generated on the surface of the photoreceptor by the charging means, approaches the desired output value; and storing means for storing values of voltages applied to the charging means in image formation, wherein prior to image formation, after sensitivity correction of the detecting means and calculation of the desired output value have been performed, the surface of the photoreceptor is charged by the charging means by using a voltage corresponding to a value stored in the storing means after a previous image formation, the controlling means controlling the voltage applied to the charging means to provide a controlled voltage from the stored voltage value while the charging means charges the surface of the photoreceptor until an appropriate voltage is found which causes the detecting means to output a value closest to the desired output value, the surface of the photoreceptor thereby being charged by the charging means by using the appropriate voltage.

2. An image forming apparatus according to claim 1, wherein the detecting means outputs a value linearly corresponding to a charge potential.

3. An image forming apparatus according to claim 1, wherein the controlling means comprises a microcomputer.

4. An image forming apparatus according to claim 1, further comprising exposing means for forming an image, wherein the desired output value is a value desired for a condition where the photoreceptor is not exposed by the exposing means.

5. An image forming apparatus according to claim 1, further comprising timer means for determining an elapsed time since a previous image formation, wherein the apparatus performs image formation after the appropriate voltage has been formed only when the elapsed time since the previous image formation exceeds a predetermined period of time, and wherein the apparatus performs image formation with the surface of the photoreceptor charged by the charging means to a voltage applied in a previous image formation when the elapsed time is within the predetermined period of time.

6. An image forming apparatus comprising:

a photoreceptor;

charging means for charging a surface of the photoreceptor;

detecting means for detecting a potential of the surface of the photoreceptor;

potential generating means for generating a predetermined potential on the surface of the photoreceptor directly;

detection sensitivity correcting means for correcting a sensitivity of the detecting means based on an output value of the detection means which has read out a potential generated by the potential generating means on the surface of the photoreceptor and for calculating a dark portion desired value which is an output value of the detecting means corresponding to a desired charge potential and a bright portion desired value corresponding to a desired potential for an exposed portion;

charging controlling means for controlling a voltage applied to the charging means so that an output value of the detecting means which has detected a potential generated through the charging of the surface of the photoreceptor by the charging means approaches the dark portion desired value;

exposing means for exposing the charged surface of the photoreceptor to form a latent image;

exposure controlling means for controlling a voltage applied to the exposing means so that an output value of the detecting means which has detected a potential of an exposed portion on the surface of the photoreceptor formed by the exposing means approaches the bright portion desired value; and storing means for storing a voltage applied to the charging means and a voltage applied to the exposing means in image formation, wherein prior to image formation, after the sensitivity correction of the detecting means and the calculation of the dark portion and bright portion desired values are performed, the surface of the photoreceptor is charged by the charging means by using a voltage applied in a previous image formation stored in the storing means, a control of the applied voltage by the charging controlling means and the charging are repeated, an appropriate charging voltage to be applied to the charging means is found which causes the detecting means to output a value closest to the dark portion desired value, and the surface of the photoreceptor is charged by applying the appropriate charging voltage to the charging means, and thereafter, the surface of the photoreceptor is exposed by the exposing means by using a voltage applied in the previous image formation, a control of the applied voltage by the exposure controlling means and the exposure are repeated, an appropriate exposing voltage to be applied to the exposing means is found which causes the detecting means to output a value closest to the bright portion desired value, and after the surface of the photoreceptor is charged by applying the appropriate charging voltage to the charging means, a latent image is formed on the surface of the photoreceptor by applying the appropriate exposing voltage to the exposing means.

7. An image forming apparatus having a function to charge a surface of a photoreceptor at an appropriate potential prior to image formation, said image forming apparatus comprising:

a photoreceptor;

charging means for charging a surface of the photoreceptor;

detecting means for detecting a potential of the surface of the photoreceptor;

detection sensitivity correcting means for correcting a sensitivity of the detecting means;

charging controlling means for controlling a voltage applied to the charging means;

exposing means for exposing a charged surface of the photoreceptor to form a latent image; and exposure controlling means for controlling a voltage applied to the exposing means, wherein after a sensitivity correction of the detecting means, the surface of the photoreceptor is charged by the charging means by applying a predetermined voltage, a control of the applied voltage by the charging controlling means and the charging are repeated, an appropriate charging voltage to be applied to the charging means which generates an appropriate potential is found, and the surface of the photoreceptor is charged by the charging means by using the appropriate charging voltage, and thereafter, the surface of the photoreceptor is exposed by the exposing means by applying a predetermined voltage, a control of the applied voltage by the exposure controlling means and the exposure are repeated, an appropriate exposing voltage to be applied to the exposing means which makes a potential of an exposed portion appropriate is found, and after the surface of the photoreceptor is charged by the charging means by using the appropriate charging voltage, a latent image is formed on the surface of the photoreceptor by the exposing means by using the appropriate exposing voltage.

8. An image forming apparatus according to claim 7, wherein the predetermined voltages applied to the charging and exposing means are voltages applied in a previous image formation.

9. An image forming apparatus comprising:

a photoreceptor drum;

a main charger for charging the photoreceptor drum;

a first high-voltage generator for applying a voltage to the main charger;

a potential sensor for detecting a surface potential of the photoreceptor drum;

a second high-voltage generator for generating a predetermined potential on the photoreceptor drum directly; and a controller connected to the first and second high-voltage generators, wherein prior to image formation, said controller causes the second high-voltage generator to generate the predetermined potential on the photoreceptor drum, corrects a sensitivity of the potential sensor based on an output value of the potential sensor which has detected the predetermined potential on the photoreceptor drum, calculates a desired value which is an output value of the potential sensor corresponding to an appropriate potential, causes the first high-voltage generator to generate a voltage applied in a previous image formation as an initial value so that the photoreceptor drum is charged by the main charger, obtains an appropriate voltage for charging the photoreceptor drum at an appropriate potential by repeating a correction of an output of the first high-voltage generator and the detection of the potential so that an output value of the potential sensor which has detected the potential approaches the desired value, and charges the photoreceptor drum at an appropriate potential by using the appropriate voltage.

* * * * *